May 3, 1927. 1,626,701
F. H. SLEEPER
EXPANSION PULLEY
Original Filed Jan. 14, 1925  2 Sheets-Sheet 1
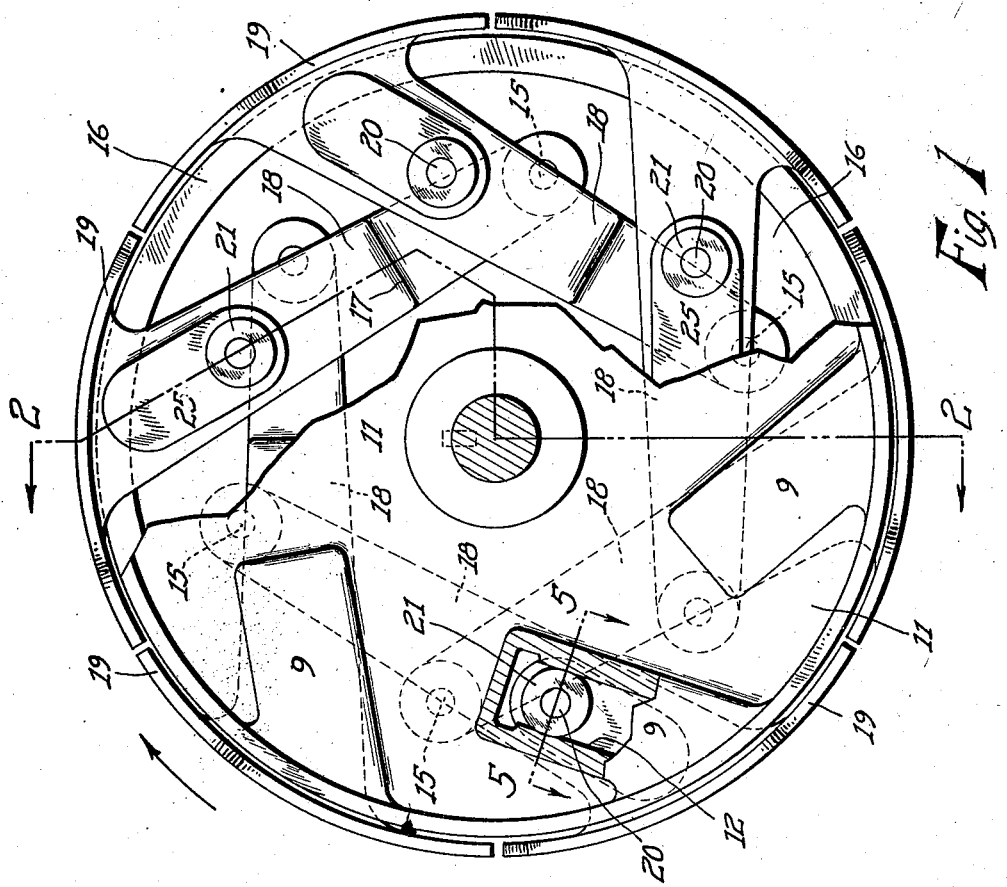
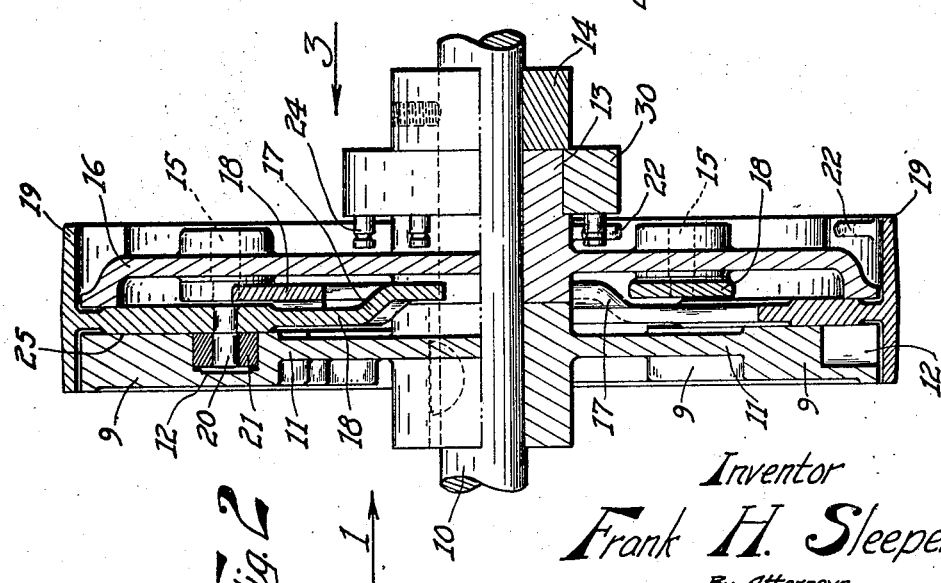
Inventor
Frank H. Sleeper
By Attorneys May 3, 1927. 1,626,701
F. H. SLEEPER
EXPANSION PULLEY
Original Filed Jan. 14, 1925  2 Sheets-Sheet 2
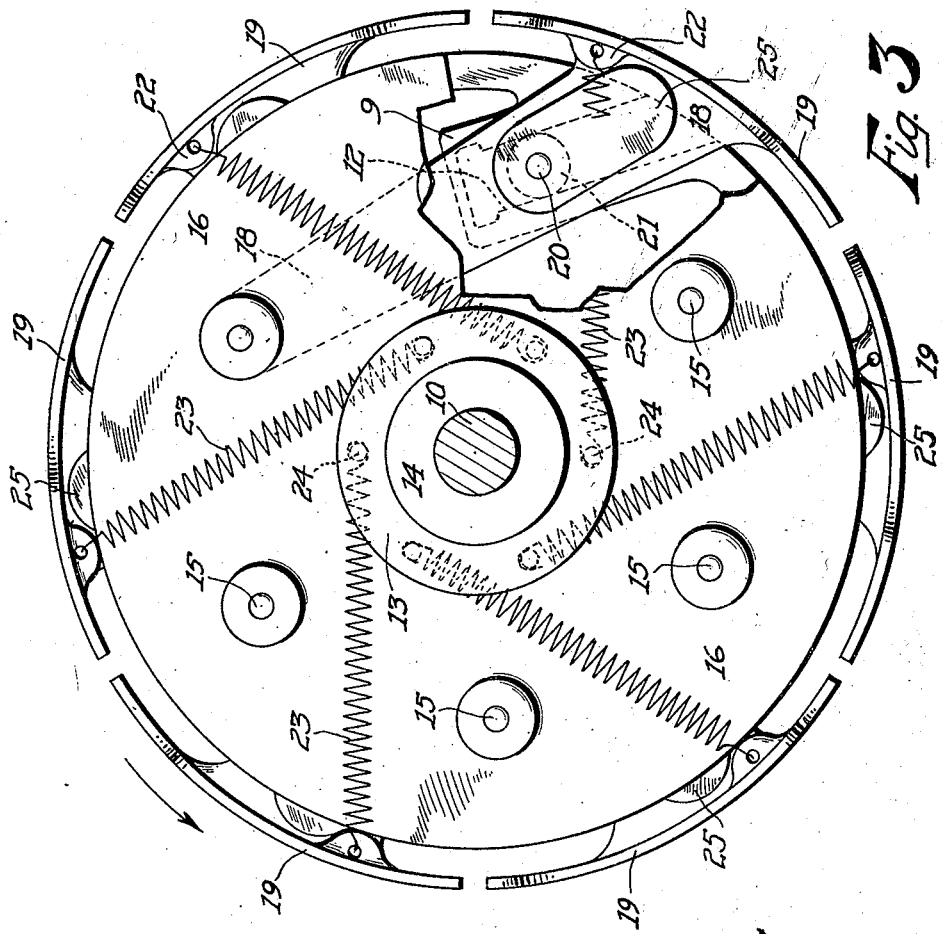
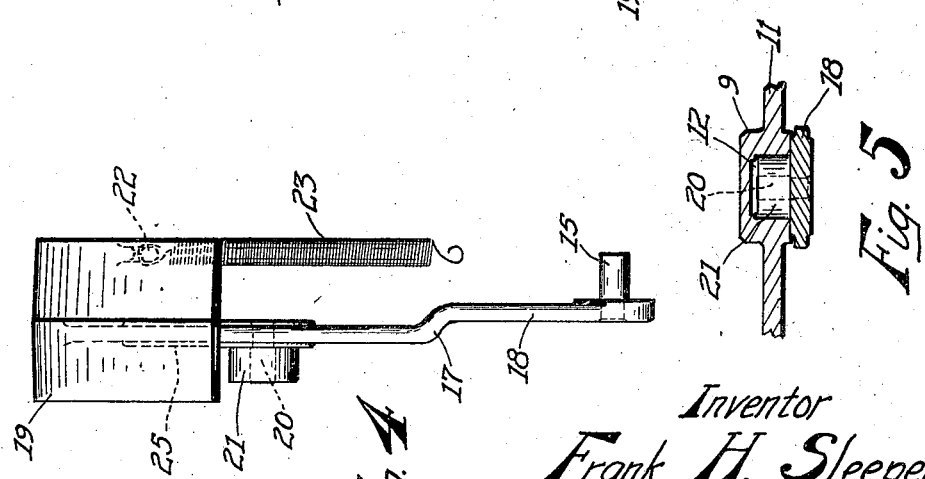
Inventor
Frank H. Sleeper
By Attorneys Patented May 3, 1927.

1,626,701

UNITED STATES PATENT OFFICE.

FRANK HENRY SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

EXPANSION PULLEY.

Application filed January 14, 1925, Serial No. 2,447. Renewed January 26, 1927.

This invention relates to an improvement over a pulley patented by me on June 3, 1924, No. 1,496,032. This invention has substantially the same objects as expressed in said patent and in addition thereto involves the simplification of construction and the reduction in cost of manufacture without reducing the efficiency.

By this invention a pulley for transmitting power is constructed in sections, each section being adapted to yield inwardly and move outwardly. In case of the driven pulley the parts are so arranged that when the torque on the shaft increases the diameter of the pulley increases so that its speed will decrease in that case or increase if the torque decreases. In the case of a driving pulley, when the power transmitted is increased the diameter of the pulley will be reduced to automatically slow down the speed of drive. When the load on the driving shaft decreases the diameter of the pulley will automatically increase to increase the speed of the driven shaft to which the power is transmitted by the belt. In either case the relative rotation of the pulley and shaft on which the pulley is loosely mounted will change the size of the pulley. Also yielding means is provided as in the other case for resisting the motion of the pulley sections in a direction which will decrease the speed of transmission of power through the pulley.

More specifically stated, this invention involves the mounting of the pulley segments to swing on pivots instead of sliding, and the location of those pivots far enough away from the pulley segments, and in such a position, that, with the slight movement that takes place, no great distortion of the circular shape of the pulley will be apparent in any ordinary use of the pulley. This invention also involves the special construction of the pivot arms for supporting the pulley segments so that they will not interfere with each other and so that the several parts of the pulley will have finished bearing spots that will keep them in the proper positions.

Other objects and advantages of the invention will appear hereinafter.

Reference is to be had to the accompanying drawings in which—

Fig. 1 is a side view of a driven pulley in contracted condition constructed in accordance with this invention with parts broken away and in section to show interior construction;

Fig. 2 is a sectional view on the broken line 2—2 of Fig. 1;

Fig. 3 is a rear view of the pulley with parts broken away and showing it in a more expanded condition than in Fig. 1;

Fig. 4 is an edge view of one of the pulley segments with all the parts attached thereto that really constitute a part of it; and Fig. 5 is a transverse sectional view on the line 5—5 of Fig. 1.

I have illustrated merely the driven pulley but the driving pulley is constructed on the same principle with the parts changed just as illustrated in my above mentioned patent. The driven shaft 10 has keyed upon it the hub of a flat disc 11. This disc is provided with a series of cam slots 12 located in enlargements 9 extending inwardly from the circumference and tangentially. They are all tangent to a circle drawn from the center through their corners which are nearest the shaft. Therefore they are all located at equal definite angles to radial lines at these points.

Loosely mounted on the driven shaft 10 is the hub 13, with web 16, of the pulley. This hub is intended to connect with the shaft through the disc 11. It is shown as bearing up against a collar 14 fixed to the shaft and with its web 16 provided with a series of pivot studs 15. Pivotally mounted on these studs 15 are a series of stems 18 each one having a pulley rim segment 19 on its outer end, preferably integral therewith. These segments 19 taken together constitute the entire rim of the pulley and extend over the disc 11 as indicated in Fig. 2. It will be noted that the studs 15 are arranged in such position that the pulley rim segments swing out and in on an arc having as long a radius as can be conveniently provided and in such a direction that when they swing out they do not seriously modify the circular shape of the rim. As shown in Fig. 3, when expanded considerably it would never be noticed that the pulley is not perfectly circular.

For this purpose, each stud is placed outward as far away from the shaft as possible and at a distance from the pulley rim segment 19, with which it is connected, great enough to give the latter the movement above described. I have shown these pivots as being located at a distance from their own pulley rim segments a little more than the length of a segment, so that they come under the second alternate segment in each case. Of course they are all located at the same distance from the center. On account of this location, these stems cross each other; in fact each one of them crosses two others. For this purpose they are bent at 17 so as to avoid engagement of any stem with the next two. Each stem projects under the next one on one side of its pivot end and over the pivoted end of the one on the other side.

Each stem 18 is provided with a projection or stud 20 on which is rotatably mounted a cam roll 21, engaging in one of said cam slots 12. Of course it will be understood that the number of these stems and pulley segments is equal to the number of cam slots 12 and each of these rolls 21 is located in one of the cam slots. On both sides of each stem is located a plane finish spot 25, those on one side engaging the plane surface of the projections 9 on the disc 11 and those on the other side engaging the inturned edge of the disc 16, so that the two discs rest against plane surfaces opposite each other.

On the rear of each rim segment there is a stud 22 to which one end of a tension spring 23 is secured. The other end of the spring is secured to a projection 24 on a ring 30 which is fixed on the hub 13. These springs are arranged tangent to this ring and in such position as shown in Fig. 3 as to tend to swing the rim segments inwardly about their pivots 15 at the greatest advantage, that is, they are transverse to a line drawn from each pivot to the opposite end of the corresponding rim segment 19.

This construction is employed to hold the rim segments in toward the center and in that way they tend to resist increase in the size of the driven pulley and consequent reduction of speed ratio. In the case of the driven pulley they also resist the action of centrifugal force, if the pulley is driven fast enough to bring that into action sufficiently to move these segments. In place of the springs I can employ any means for resisting changes in diameter of the pulley stated. In the case of both driving and driven pulley these springs resist a change that would cause a decrease in the speed of transmission. The pulley is rotated in the direction indicated by the arrows, namely, anti-clockwise as viewed in Fig. 1 and clockwise as viewed in Fig. 3.

It will be seen that as power is transmitted from a belt running over the rim 19 through the several pivoted stems 18 to the rolls 21 and by them through the slots 12 to the disc 11 for rotating the shaft 10, increase in torque will expand the pulley. Therefore, the pulley will transmit its power to the shaft 10 at a slower speed if it is a driven pulley. This change in speed is governed automatically by the resistance on the driven shaft.

Furthermore whenever less resistance is placed on the shaft the cam action on the rolls will tend to move the rim sections inwardly. That can be done only by relative motion of the rolls in the slots toward the inner ends thereof. This reduces the diameter of the pulley and will increase the speed ratio and drive the shaft faster. If centrifugal force be disregarded the only thing causing a change in the diameter of the pulley is a change in the torque.

When the invention is applied to a driving pulley, all the elements are made in the same way except that compression springs are substituted for the springs 23 the direction of rotation being the same. Now if this shaft be considered as the driver, the rim is driven from it and an increase in power required will tend to pull the segments of the pulley in to reduce its size thus slowing down the speed of the belt automatically. It will be understood that it is my intention to employ a pair of pulleys, one as a driver and the other as a driven pulley constructed as described.

In a construction of this kind, there is a minimum of friction tending to resist the movement of the pulley segments out and in and no chance of their getting cramped or bound in position. Furthermore there are no guiding surfaces that will have to be planed out and fitted and may get out of true on account of wear. By that I mean that there are no guiding surfaces at the forward and rear sides of the arms 18 as in my prior patent. It is a simple construction to manufacture and a comparatively inexpensive one, the parts are assembled very easily, and it will work conveniently after a comparatively large amount of wear.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described but what I do claim is:—

1. An automatically expansible and contractible pulley, comprising a plurality of rim segments, each having a stem projecting inwardly at an angle to a radial line, a web member loose on the shaft of the pulley and carrying studs on which said stems are pivoted, a disc fast on the shaft and having cam slots equal in number to said segments, a roller carried by each stem to engage in one of said slots, and yielding means to resist movement of said segments.

2. An expansible pulley, comprising a disc fast on the pulley shaft and having a plurality of angular slots tangential to a common circle, a hub and web member loose on the shaft and provided with a plurality of pivot studs, a plurality of rim segments each having a stem projecting inwardly at an angle to a radial line and pivotally connected to said studs, a roller carried by each of said stems intermediate its ends and engaging in one of said slots, and spring means to resist radial movement of said segments.

3. An automatically expansible and contractible pulley, comprising a disc fast on the shaft and provided with cam slots, a second disc loose on the shaft, a plurality of rim segments, each having a stem pivoted to said loose disc, a roller on each of said stems engaging one of said slots, and resilient means to resist radial movement of said segments.

In testimony whereof I have hereunto affixed my signature.

FRANK HENRY SLEEPER.